March 1, 1966     C. E. PETERSON     3,237,479
FOOT PEDAL DEVICE
Filed Dec. 28, 1964     2 Sheets-Sheet 1
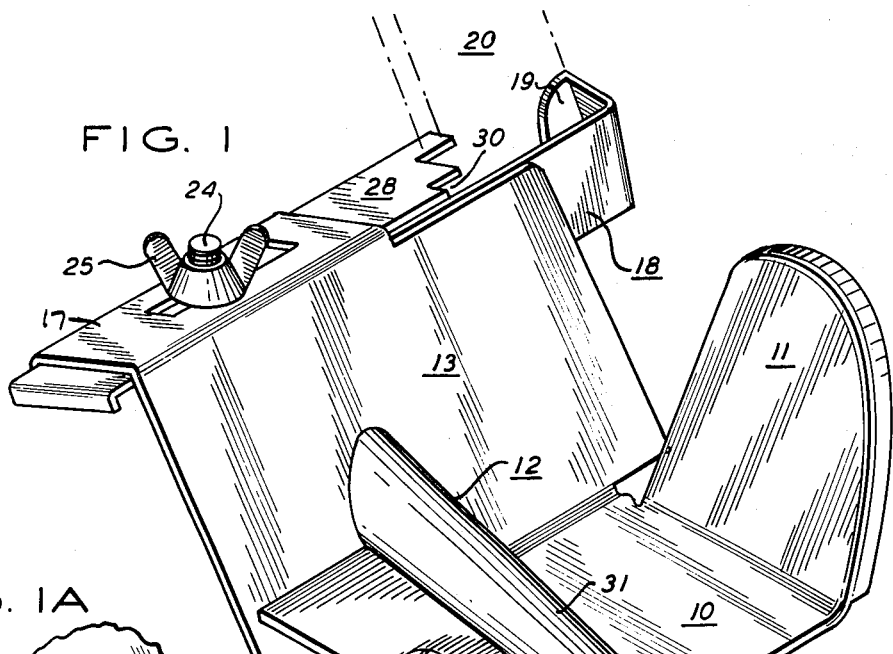
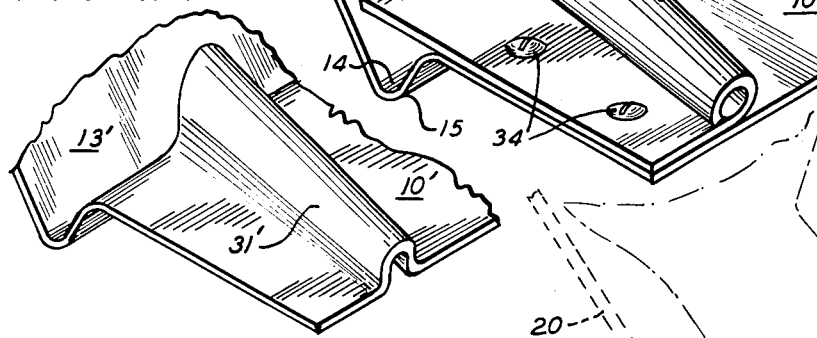
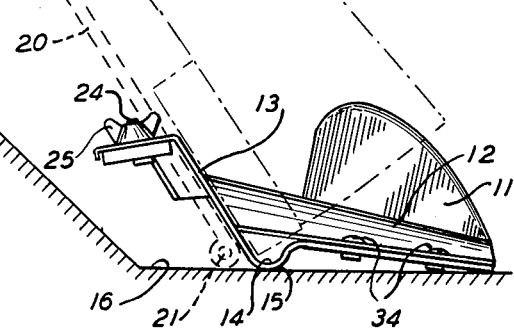
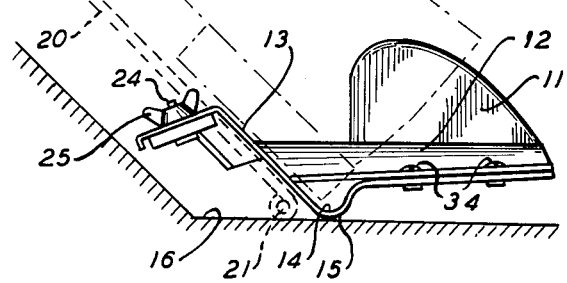
INVENTOR.
C. E. PETERSON
BY
ATTORNEY

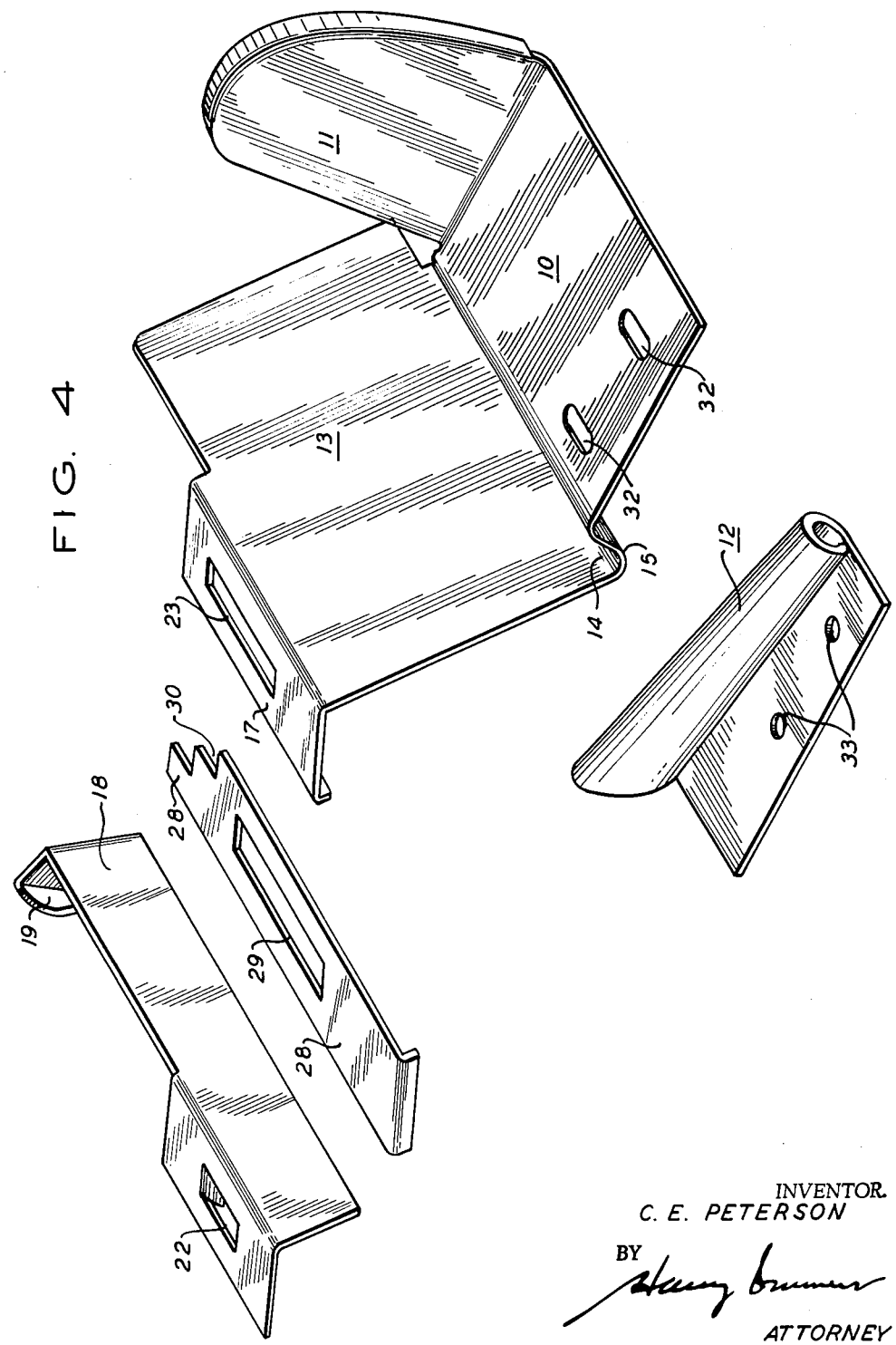

3,237,479
FOOT PEDAL DEVICE
Carl E. Peterson, Upper Montclair, N.J., assignor to Eastern Tool & Manufacturing Co., Belleville, N.J., a corporation of New Jersey
Filed Dec. 28, 1964, Ser. No. 421,510
7 Claims. (Cl. 74—562)

This invention relates to a foot pedal device especially adapted for use with a vehicle having pedals to be moved, for example, for controlling gas or fluid delivery in an arrangement facilitating actuation of the foot pedal, with substantial reduction in fatigue of the operator. A comfortable rest position is provided for the operator's foot and automatic safety features are incorporated such as to assure continued control of the pedal.

The device incorporates novel features of adjustability such as to enable it to be adapted to a variety of pedals, for example, for automobiles of various makes and models, with equal efficacy. A further feature of the device is provision of an offset edge engageable with the floor of the vehicle, enabling the device to be readily positioned thereagainst. The device is adapted to be secured directly to the pedal and to move in unison therewith; in addition to the advantages and objects above set forth, further advantages and objects will appear from the description below.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a perspective view of the device applied to a foot pedal, shown in dotted lines, FIG. 1A is a fragmentary perspective view of another form thereof, FIG. 2 is an end elevational, schematic partly sectional view, showing the position of the device at the pedal location, and showing, in dotted lines, the position of the operator's foot, FIG. 3 is a similar view, showing the parts on further movement of the pedal, FIG. 4 is an exploded, perspective view of parts of one form of the device.

As shown in the drawings, the device, which may be fabricated of metal, plastic or other suitable material, comprises a base plate portion 10 and a first upwardly extending portion 11 at one end of the base plate, to limit movement of the user's foot on the base plate and with a second upwardly extending end portion, extending from the base in angularly spaced relation to the first wall portion 11 and unitary with base 10 or separate, as desired. Said wall portions 11 and 12 and the base portion 10 define a cradle for convenient positioning of the operator's foot, as indicated in dotted lines in FIGS. 2 and 3; a wall portion 13 may extend angularly of base plate portion 10 and preferably connected thereto by an offsetting edge portion 14 which may be proportioned for facility of registration of the heel of the operator's shoe therewith (FIGS. 2 and 3). The edge portion 14 thus defines an edge 15 engageable with the floor 16 of the vehicle. A flanged top portion 17 extends from the wall portion 13 and a first plate 18 extends in said device laterally of the wall portion and is provided with a formed end 19 to be positioned against an edge of the pedal 20. The latter may be suitably mounted in the vehicle in any of several different forms, as, for example, by being pivoted at 21 (FIG. 3) to the floor 16 of the vehicle or being mounted on a plate having a support shaft passing through the floor of the vehicle and reciprocating in a slot therein or mounted from an upper point pendantly. The mounting for the pedal 20 may be of any form suitable to the particular vehicle in connection with which it is used.

The first plate 18 may be formed as one piece with or separately and adjustably mounted relative to the flanged portion 17 by (FIG. 4) providing slots 22, 23 in the first plate 18 and in the flanged portion 17; suitable bolt or other means 24 (FIG. 1) may be passed therethrough to facilitate interlocking the parts in adjusted position. The first plate 18 may be further contoured to conform to the flanged portion 17 and wall portion 13 angularly as shown in FIG. 4.

A second plate 28 is adjustably connected to the wall 13, as, for example, by providing said second plate with a slot 29 for registration with the slot 23 of the flange portion 17. Said second plate may be provided with a shouldered end 30 (FIG. 1) to adjust the device to receive pedals of various dimensions between the first and second plates.

From the foregoing it will be apparent that the device may be readily positioned at the pedal location and, by adjusting the bolt 24, the first and second plates 28 and 18 may be positioned and then tightened to interlock the pedal therebetween, for movement of the pedal and device essentially unitarily in the operation of the vehicle.

The second extending portion 12 of the device, upwardly directed from the base portion 10, may be formed as a curved edge 31 (FIG. 1) and may be adjusted relative to the first upwardly extending portion 11 to define therebetween the proper spacing for the user's foot. To that end the base plate 10 may be provided with slots 32 (FIG. 2) to receive bolts or other latching means 33, or said portion 12 may be formed unitarily with base plate 10.

The various parts of the invention described and illustrated in the drawings may be made unitarily instead of being formed separately and conversely may be formed separately instead of unitarily within the scope and purview of the invention. The FIG. 1A form of the invention wherein base plate 10' has second extending portion or curved edge 31' formed unitarily with the wall portion 13' and base plate 10 instead of being formed separately as in FIG. 1.

The device of this invention enables the user to comfortably rest his foot on a support in a position which facilitates shifting his foot with minimum exertion from foot pedal to brake and back again as required; novel features of adjustment enable it to provide desired positions for various drivers.

While the foregoing disclosure of exemplary embodiments is made in accordance with the patent statutes, it is to be understood that the invention is not limited thereto or thereby, the inventive scope being defined in the appended claims.

I claim:

1. In a foot pedal device for attachment to an existing foot operated control device for a motor vehicle, the combination comprising: a base plate, a first wall portion connected to one edge of said base plate and extending angularly upwardly therefrom, a flange at the upper extremity of a portion of said first wall extending angularly away from said first wall and said base, a first plate portion disposed beneath said first wall and said flange and extensible laterally beyond an edge of said first wall, said plate including an end portion for engagement with one edge of a foot pedal, a second plate portion disposed beneath said flange and movable toward and away from said end of said first plate to engage another edge of a foot pedal, and lock means associated with said flange and said first and second plate portions for securing said first and second plate portions in a selected position relative to said flange and said base and said foot pedal.

2. In a foot pedal device as set forth in claim 1, a shouldered portion at one end of said second plate to accommodate foot pedals of various dimensions between the first and second plates.

3. In a foot pedal device as set forth in claim 1, said base plate portion and said first wall portion being connected by an offsetting edge portion to define an edge to be disposed on a floor.

4. In a foot pedal device as set forth in claim 1, an upwardly extending portion disposed at one edge of the base plate to limit lateral movement of the user's foot on the base plate in one direction.

5. In a foot pedal device as set forth in claim 4, a second upwardly extending portion disposed adjacent another edge of the base plate to limit lateral movement of the user's foot on the base plate in another direction.

6. In a foot pedal device as set forth in claim 5, means adjustably connecting one of said upwardly extending portions to the base plate for selective positioning relative to the other upwardly extending portion.

7. In a foot pedal device as set forth in claim 6, one of said upwardly extending portions including a curved edge.

References Cited by the Examiner

UNITED STATES PATENTS

| Re. 19,262 | 8/1934 | Brandt | 74—560 X |
|---|---|---|---|
| 1,276,114 | 8/1918 | Reynolds | 74—560 |
| 1,328,400 | 1/1920 | Reich | 74—562 |
| 1,516,862 | 11/1924 | Loury | 74—564 |
| 2,514,414 | 7/1950 | Pomernacki | 74—562 |
| 2,802,375 | 8/1957 | Van der Gaast | 74—560 |

BROUGHTON G. DURHAM, *Primary Examiner.*

C. F. GREEN, *Assistant Examiner.*